(12) United States Patent
Stark et al.

(10) Patent No.: US 7,997,217 B2
(45) Date of Patent: Aug. 16, 2011

(54) TOOL CONTROL DEVICE AT AN AGRICULTURAL IMPLEMENT

(75) Inventors: Crister Stark, Väderstad (SE); Johan Mattsson, Motala (SE)

(73) Assignee: Vaderstad-Verken Aktiebolag, Vaderstad (SE)

( * ) Notice: Subject to any disclaimer, the term of this patent is extended or adjusted under 35 U.S.C. 154(b) by 55 days.

(21) Appl. No.: 12/446,072

(22) PCT Filed: Oct. 11, 2007

(86) PCT No.: PCT/SE2007/050733
§ 371 (c)(1),
(2), (4) Date: Jun. 5, 2009

(87) PCT Pub. No.: WO2008/048178
PCT Pub. Date: Apr. 24, 2008

(65) Prior Publication Data
US 2010/0192820 A1 Aug. 5, 2010

(30) Foreign Application Priority Data

Oct. 20, 2006 (SE) .................................... 0602228

(51) Int. Cl.
*A01B 63/32* (2006.01)
*A01B 73/00* (2006.01)
*A01C 5/06* (2006.01)
*A01C 7/08* (2006.01)

(52) U.S. Cl. .......... 111/52; 111/151; 111/165; 111/167; 172/260.5

(58) Field of Classification Search .................... 111/52, 111/55, 60–62, 66, 68, 149, 151, 926, 157, 111/163–165, 167; 172/260.5, 462, 464, 172/465, 478, 482, 487, 488, 500, 776
See application file for complete search history.

(56) References Cited

U.S. PATENT DOCUMENTS
5,065,681 A 11/1991 Hadley
5,398,771 A 3/1995 Hornung et al.
2006/0081162 A1 4/2006 Hoehn FOREIGN PATENT DOCUMENTS
EP 1 285 564 A1 2/2003
SE 139 922 C 4/1953
SE 527 842 C2 6/2006
WO WO-2006/031182 A1 3/2006

*Primary Examiner* — Christopher J. Novosad
(74) *Attorney, Agent, or Firm* — Birch, Stewart, Kolasch & Birch, LLP

(57) ABSTRACT

The invention refers to an implement regulating device in an agricultural machine including at least one group of implements (4) arranged across the driving direction, thereafter cross-wise arranged support members (15) and at least one each group of implements and support members are controllable and adjustable by a power device (23). Implements (4) and support members (15) in each group are journalled in bearings at one end of at least one carrying arm (13). The power device (23) is adapted to rotate a cross-running main beam (19). The main beam is connected with the carrying arm (13) via a spring member (18) and is rotatably suspended in relation to the frame (Ia) of the machine (1). Activation of the power device is adapted to influence the carrying arm between a position for maximum sowing depth and a transport position.

15 Claims, 4 Drawing Sheets

TOOL CONTROL DEVICE AT AN AGRICULTURAL IMPLEMENT

The present invention relates to an implement regulating device at an agricultural machine according to the ingress of claim 1.

BACKGROUND AND KNOWN TECHNOLOGY

It has long been known to regulate sowing depth of a seed drill. The machine type referred to here is a seed drill of the type that is shown in the Swedish patent SE 527 842 and that has at least one sowing edge implement, such as a seed coulter, which suitably has at least one rotating disc, and which has a support, which regulates sowing depth. This support is suitably comprised of a rotating wheel but can also consist of for example a collector shoe. A common coulter type called V-disc comprises two discs placed at angles and between which is mounted a seed tube, which via flexible hoses, distributor and dosing device is connected to a hopper for seed and/or fertiliser. The seed coulter is commonly suspended with spring in the seed drill by means of an arm. Seed drills with this seed coulter construction can have individual depth setting often through the support wheel having an adjustment potential, which is advantageous for different crops, which require different sowing depths. Alternatively, all seed counters are depth-adjusted centrally or per section since a machine often has several sections. It must also be possible to lift the seed coulters out of the soil with sufficient clearance for transport driving on field or on road.

An implement of the above-mentioned type can be a seed coulter, which is adjustable in depth direction in relation to its support wheel (sowing depth setting). It has a variable downward force in order to be set for different soil types. The seed coulter ensures continuous contact against an uneven surface and also adjusts itself in a quick and stable way to the correct relative depth position when the machine is driven with good speed over an uneven field. It tolerates solid obstructions such as stones and it is adapted so that it can be lifted up out of the soil to a sufficient clearance height that can be up to approx. 300 mm.

Known technology often utilises an adjustment where the depth of each seed coulter is adjusted manually. On larger seed drills with perhaps 60-100 seed coulters this is obviously very impractical.

Depth setting can also occur centrally. It usually occurs through two systems, one where an implement bearing beam is brought into a predetermined height position through the entire machine being adjusted to this height or another where the machines has joints and a separate hydraulic cycle for this purpose. Another hydraulic cycle exerts the spring power of the seed coulters towards the soil. Such exertion also occurs manually through crank handles on certain machine types. These known systems are complex and complicated in their construction and function.

OBJECT OF THE INVENTION

The objective of the present invention is to achieve an implement regulating device at an agricultural machine of the initially described type, which device solves the above-mentioned problems.

SUMMARY OF THE INVENTION

The objective is achieved by an implement regulating device at an agricultural machine, which device has been given the characterising features of claim 1.

Preferred embodiments of the implement regulating device according to the invention have been given the characteristics presented in the sub-claims.

DRAWING SUMMARY

The invention is described more closely in the following with reference to the attached drawings, which show a preferred embodiment.

DETAILED DESCRIPTION OF A PREFERRED EMBODIMENT

Figure 1:
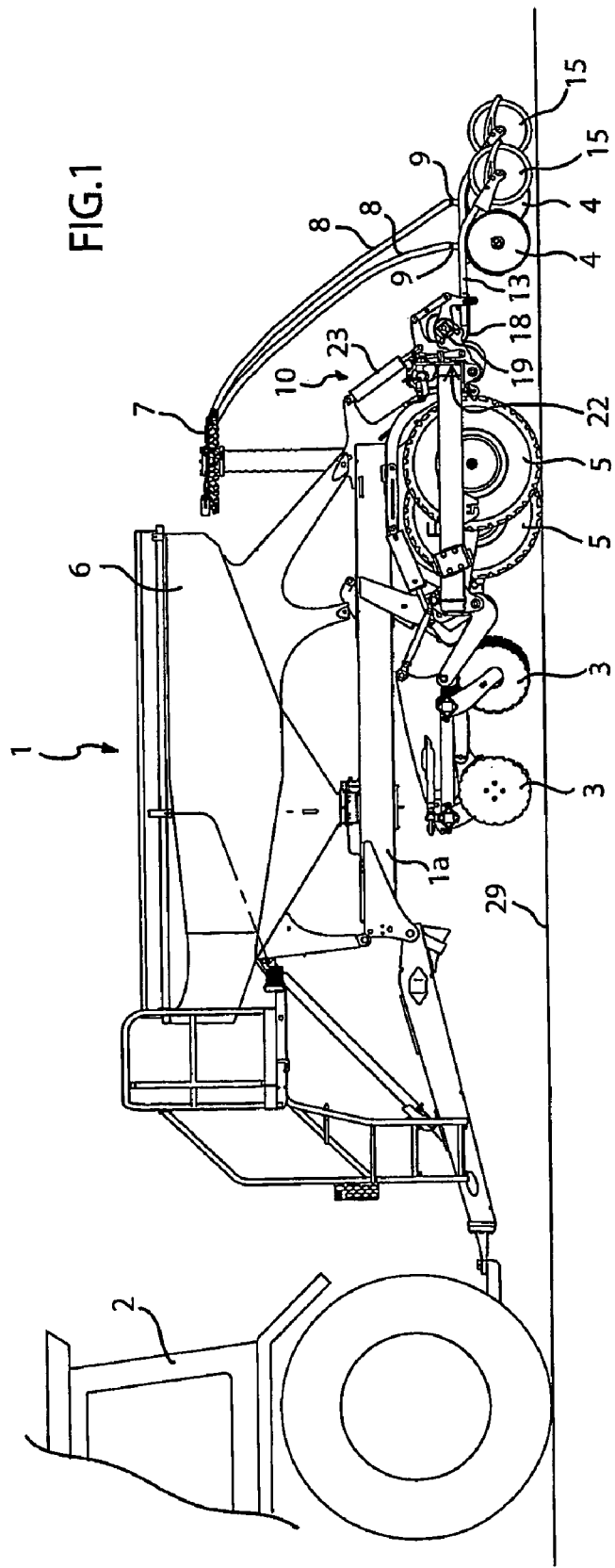
FIG. 1 shows a side view of an agricultural machine with an implement regulating device according to the invention, where only a part of a tractor is visible and where the implement regulating device and the coulters are shown in an initiating transport position.

Similar parts/details at the embodiments described and depicted in the drawings have been given the same reference number. By the expressions 'fore' and 'rear' is meant the position in the driving direction.

Figure 2:
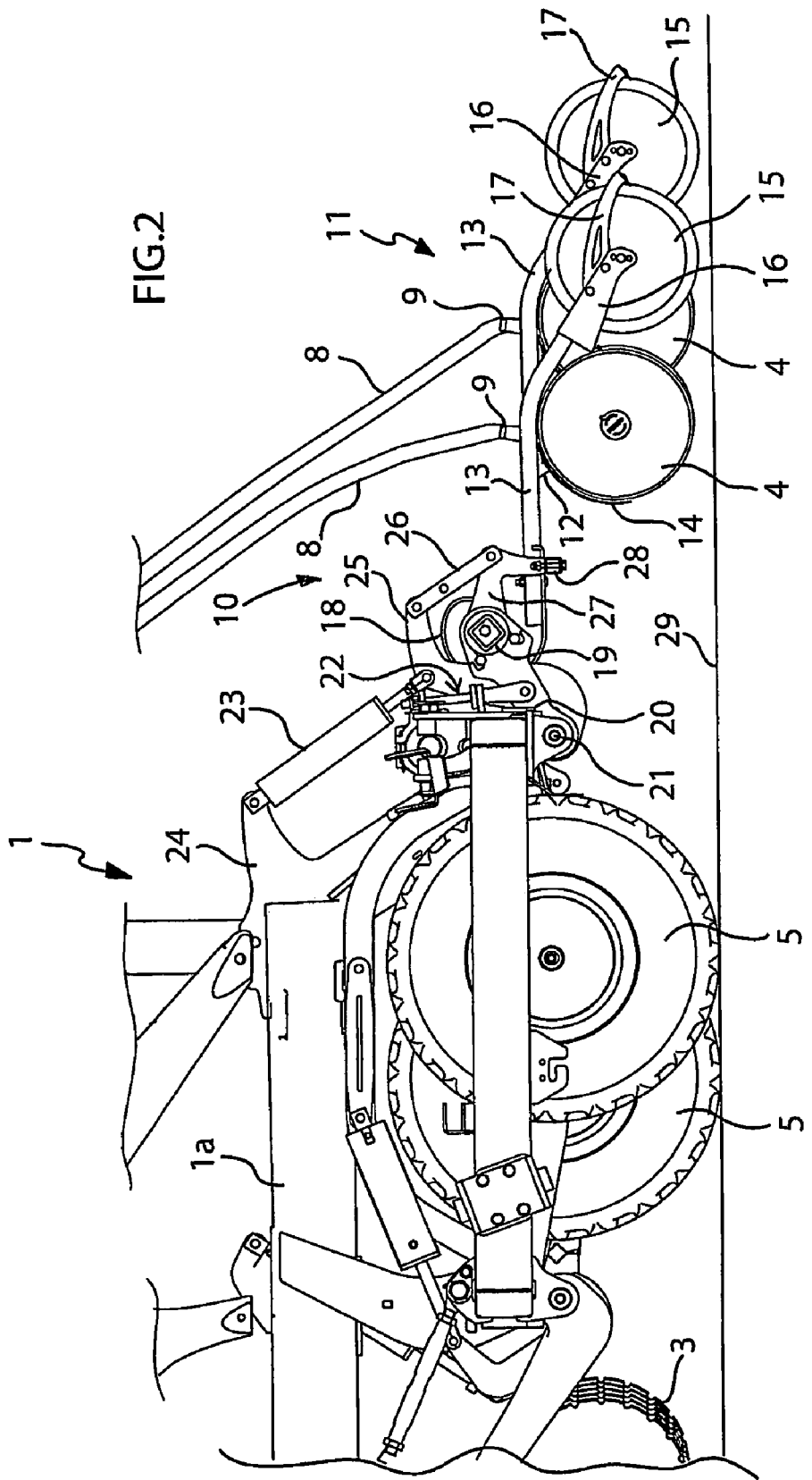
FIG. 2 shows an enlarged part of the side view in FIG. 1.

FIGS. 1-2 depict an embodiment of an agricultural machine 1 for soil tillage and sowing to with a implement regulating device according to the invention.

In FIG. 1 the agricultural machine is shown in an initiating lift position for these implements. The agricultural machine 1 is drawn by a tractor 2 and comprises here a fore set of soil tillage implements in the form of rotating discs 3 and a rear set in the form of seed coulters 4. The agricultural machine machine 1 runs on wheels 5, which can also function as packer wheels. A hopper 6 for seed and/or fertiliser is arranged at the frame 1a of the agricultural machine 1 and via a not shown dosing and transport system the seed is fed out to a distributor device 7 for further feeding out via flexible hoses 8 to seed tubes 9 on the seed coulters 4.

FIG. 2 shows on an enlarged scale and therefore more in detail an implement regulating device 10 according to the invention for the rear sowing implements 11 of the agricultural machine 1. The sowing implements 11 comprise implements in the form of two angled discs below called seed coulters 4, which are each journalled in bearings on a wheel bearings arm 12 mounted on a carrying arm 13, and also support wheels 15, which are each journalled in bearings at an end portion 16, which is mounted at the end of the arm 13, and is also provided with a scraping device 17. The sowing implements 11 are mounted via carrying arms 13 and a spring device 18, which in this case is C-springs, on a cross-running main beam 19. The beam 19 is carried by the machine 1 by means of an intermediate arm 20, one end of which is journalled in bearings on an axle 21 and the other end of which is journalled in bearings around the main beam 19. A restricting device 22 restricts the movement of the sowing implements 11. Instead of C-springs the beam can be connected with the carrying arms 13 via elastic bushings, e.g. of rubber, arranged on the beam.

Figure 3:
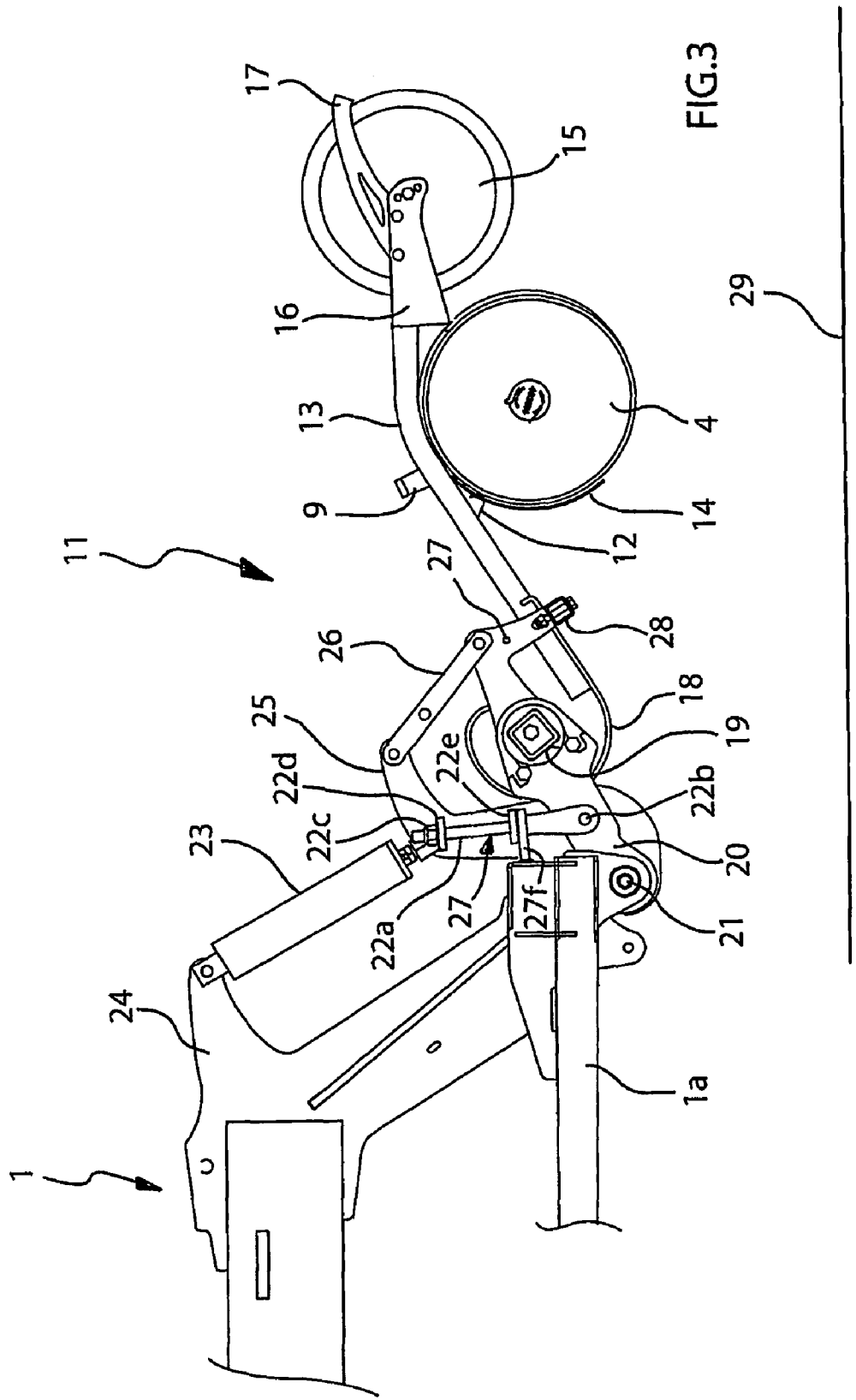
FIG. 3 shows a partial, further enlarged side view of the agricultural machine in FIG. 1, where the implement regulating device and the coulters are shown in a transport position.

The restricting device 22 in FIG. 3 consists of a rod 22a, one end of which is rotatably journalled in bearings on an axle 22b on the intermediate arm 20 and the other end of which is threaded. A nut 22c, preferably a stop nut, is screwed onto the threaded end in a predetermined position and has underneath a hole-provided, upper stop part 22d arranged thereon. A stop clip or a hole-provided spacer 22e is inserted onto and freely moveable on the rod 22a between the upper stop part 22d and a hole-provided, lower stop part 22f, which is fastened at the frame 1a, suitably welded fast. The rod 22a extends through the hole in the stop part 2f and is freely moveable forward and back. Through using more than one spacer 22e with similar thicknesses or several spacers 22e of different thicknesses different maximum sowing depth can be obtained for the seed coulters 4.

At least one hydraulic cylinder 23 is connected between an arm 24 on the frame 1a of the machine 1 and a lever arm 25, one end of which is journalled in bearings at the axle 21 and the other end of which is rotatably connected with an adjustable link arm 26. The link arm 26 is in its turn jointedly connected to a protrusion 27 on the main beam 19. The protrusion 27 is rigidly connected at a cross-running lifting beam 28, which extends in the cross direction of the machine under the carrying arms 13. The reference number 29 denotes the soil surface.

Figure 4:
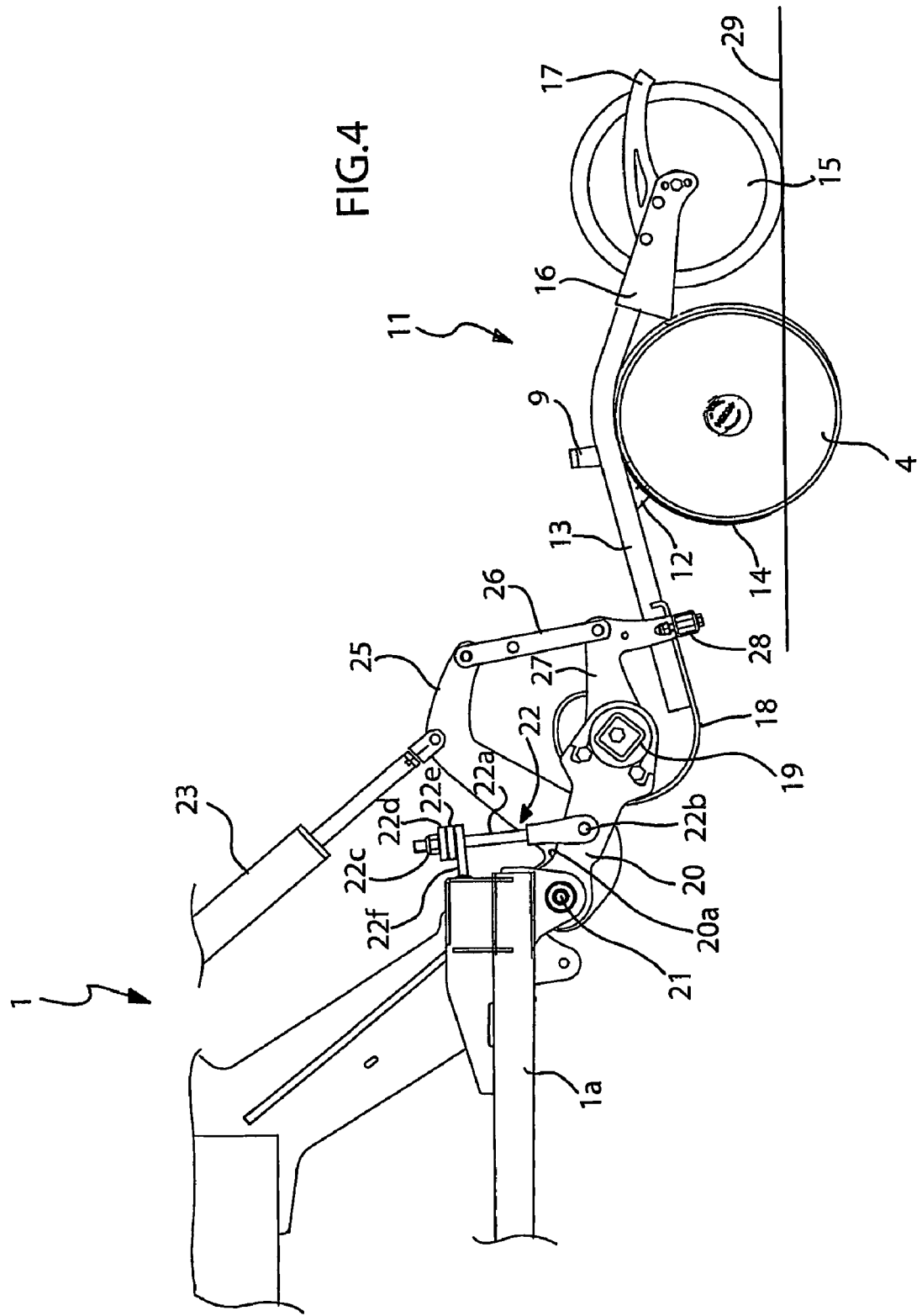
FIG. 4 shows a further enlarged side view similar to that in FIG. 3, where the implement regulating device and the coulters are shown in a work position.

The cross-running lifting beam 28 in FIG. 4 can be brought to abut against the carrying arms 13 through activation of the hydraulic cylinder or hydraulic cylinders 23. The lifting beam 28 is used to lift up the sowing implements 11 to the transport position. When the hydraulic cylinder 23 is retracted the intermediate arm 20 is raised so that its upper surface 20a comes to abut against a not shown abutting surface on the frame 1a, whereafter with continued retraction of the hydraulic cylinder 23 the lever arm 25 continues upwards and draws with it the link arm 26 and the protrusion 27. This means that the lifting beam 28 lifts up the carrying arm or more precisely the carrying arms 13 to the position that is shown in FIG. 3.

With an implement regulating device according to the invention construction parts are saved though a single or at least a few power devices regulating both raising and lowering of implements and in addition achieving pre-tension of the spring force. This means e.g. that setting of seed coulter pressure against the soil can be controlled manually from the tractor or automatically during driving with the machine. This can be very important on a field with varying soil types. All the above-listed conditions can thus be fulfilled with only one or possibly two hydraulic cylinders 23 (per section) through that:
  the coulter regulating device is mounted on a main beam 19, which holds together all seed coulters 4 on a section of the machine 1,
  the seed coulters are mounted on the main beam 19 by means of the spring devices 18 with suitable characteristics, whereby both short and long carrying arms 13 can be used. Through choosing springs with different characteristics all the seed coulters 4 in work can be made to behave similarly,
  the carrying main beam 19 is connected to the machine 1 via the jointed intermediate arm 20, which is jointed at the axle 21. This intermediate arm 20 can swing between predetermined positions, suitably a fixed upper (where the seed coulters are raised and the hydraulic cylinder can be completely retracted) and a lower that is adjustable by means of the restricting device 22. This lower position or stop sets the sowing depth since it determines the height position of the main beam 19 above the soil. The height position determines the inclination of the seed coulters. The further down this stop is adjusted, the more the entire seed coulter inclines forwards and the rotating disc cuts and sows deeper in the soil, and
  the hydraulic cylinder 23 thus influences the system through the lever arm 25, which is jointed in the axle 21. This lever arm 25 rotates the mean beam 19 through the link arm 26, which is rotatably connected to a protrusion 27 on the main beam 19, the end of which protrusion facing away from the main beam 19 is fastened at the lifting beam 28, which extends under the carrying arms 13. The link arm 26 is so orientated that its resultant force should encounter the soil surface in front of the seed coulter 4, which prevents the intermediate arm 20 from rising.

In other words the hydraulic cylinder or hydraulic cylinders 23 raise and lower the sowing implements 11, bring the main beam 19 to the correct height and pressure set each seed coulter 4 to a force that is the actual length of the relative hydraulic cylinder 23. The hydraulic cylinder 23 brings the seed coulters 4 of the sowing implements 11 between an upper raised and a lower adjustable height position, where the lower height position sets the longitudinal inclination (sowing depth) of the seed coulters and the same hydraulic cylinder 23 exerts a selected and adjustable coulter pressure. The upper height position can act as a transport position. At lifting to the transport position the carrying arms 13 rest against the lifting beam 28, which is rigidly attached to the protrusion 27 and has the task of acting as a support to hold the seed coulters 4 in a stable transport position when the system is lifted up. Without the support of the lifting arm 28 the carrying arms 13 and the implements 11 would only hang in the springs 18 in the transport position.

Several hydraulic cylinders 23 can be used, at least one on each section in the case of the machine consisting of several sections linked beside each other. These are suitably comprised of hydraulic cylinders of master and slave type. They move synchronously and all sections are thereby regulated similarly. The regulation of several sections can be done in different ways. Alternatively this can occur mechanically, cylinders can also be synchronised electronically. At a not shown preferred embodiment the main beam 19 on an agricultural machine, which has a centre section and side or wing sections, carries on the centre section approx. twenty sowing entities/implements 11, which are mounted on an equal number of carrying arms 13, while the main beam 19 in its turn is carried by only two intermediate arms and has two one cross-running lifting beam 28 carrying protrusions 27, each of which via a link arm 26 and a lever arm 25 is influenced by its own hydraulic cylinder 23.

In a further development of the implement regulating device according to the invention the main beam 19 can be journalled in bearings directly at the lower axle 22b of the restricting device 22. In this case the intermediate arm 20 can be completely eliminated.

The shown embodiment shows implements in the form of two seed coulter sets, but this number and also the type of implement (coulter, cultivator tine, disc, etc.) can naturally be varied within the frame of the following Claims. The hydraulic cylinders 23 shown in the drawings can be any known adjustment device or power device whatsoever. Several other implements can be connected either before or after the aggregate containing the implement regulating device with the coulters, as shown in the drawings, or also the coulters can be the only implement on the agricultural machine.

The implement regulating device according to the invention at the agricultural machine is in its construction not restricted to the embodiment shown in FIGS. 1-4, but can be modified within the frame of the attached claims.

The invention claimed is:

1. An implement regulating device in an agricultural machine, comprising:
   at least one group of implements arranged across the driving direction of the machine;
   cross-wise arranged support members;
   at least one carrying arm, each said at least one carrying arm having one or more implements of said at least one group of implements, said one or more implements comprising seed coulters or cultivator tines;
   cross-running main beam, which is connected to the carrying arm via a spring, is connected to the machine via a jointed intermediate arm, and is rotatably suspended in relation to a frame of the machine;
   at least one restricting member to restrict the movement of the one or more implements between a position for maximum sowing depth and a transport position; and
   power device,
   wherein at least one implement in each group of implements and the support members are controllable and adjustable by the power device,
   wherein the implements and support members comprising each group are journalled in bearings at one end of the at least one carrying arm,
   wherein said power device is adapted to rotate the cross-running main beam,
   wherein activation of said power device influences the carrying arm with said one or more implements comprising the seed coulters or the cultivator tines, between an upper raised and a lower adjustable height position, where the lower height position sets the longitudinal inclination/sowing depth of the one or more implements, and
   wherein said at least one restricting member is adjustable with regard to said sowing depth, so that the further down said restricting member is adjusted, the more the entire seed coulter inclines forwards and a rotating disc of the seed coulter cuts and sows deeper in the soil.

2. Device according to claim 1, wherein said spring member, is a C-spring, which one end is fastened at the cross-running main beam and opposite end is fastened at the end of said at least one carrying arm facing away from said group of implements and support members.

3. Device according to claim 2, wherein the cross-running main beam is adapted to lift said at least one carrying aim to the transport position on a main beam arranged protrusion, which an end facing away from the main beam carries a cross-running lifting beam, which extends under the carrying arms.

4. Device according to claim 2, wherein said support member is a support wheel, or a collector shoe.

5. Device according to claim 2, wherein said power device is an electric, hydraulic or pneumatic adjustment device.

6. Device according to claim 2, wherein said machine is comprised of a driving wheel and is connectable to the drawbar of a tractor.

7. Device according to claim 1, wherein the cross-running main beam is adapted to lift said at least one carrying arm to the transport position on a main beam arranged protrusion, which an end facing away from the main beam carries a cross-running lifting beam, which extends under the carrying arms.

8. Device according to claim 7, wherein said support member is a support wheel, or a collector shoe.

9. Device according to claim 7, wherein said power device is an electric, hydraulic or pneumatic adjustment device.

10. Device according to claim 7, wherein said machine is comprised of a driving wheel and is connectable to the drawbar of a tractor.

11. Device according to claim 1, wherein said support member is a support wheel, or a collector shoe.

12. Device according to claim 11, wherein said power device is an electric, hydraulic or pneumatic adjustment device.

13. Device according to claim 11, wherein said machine a driving wheel and is connectable to the drawbar of a tractor.

14. Device according to claim 1, wherein said power device is an electric, hydraulic or pneumatic adjustment device.

15. Device according to claim 1, wherein said machine is comprised of a driving wheel and is connectable to the drawbar of a tractor.

* * * * *